US011923627B2

(12) United States Patent
Chen et al.

(10) Patent No.: US 11,923,627 B2
(45) Date of Patent: Mar. 5, 2024

(54) ANTENNA STRUCTURE FOR SUB-6G, PCB BOARD, AND MOBILE TERMINAL

(71) Applicant: HuiZhou TCL Mobile Communication Co., Ltd., Guangdong (CN)

(72) Inventors: Lei Chen, Guangdong (CN); Liyun Liu, Guangdong (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 222 days.

(21) Appl. No.: 17/619,291

(22) PCT Filed: Dec. 19, 2019

(86) PCT No.: PCT/CN2019/126729
§ 371 (c)(1),
(2) Date: Dec. 15, 2021

(87) PCT Pub. No.: WO2021/103218
PCT Pub. Date: Jun. 3, 2021

(65) Prior Publication Data

US 2022/0368018 A1 Nov. 17, 2022

(30) Foreign Application Priority Data

Nov. 30, 2019 (CN) ......................... 201911208873.0

(51) Int. Cl.
*H01Q 9/42* (2006.01)
*H01Q 5/314* (2015.01)
(Continued)

(52) U.S. Cl.
CPC ............... *H01Q 9/42* (2013.01); *H01Q 5/314* (2015.01); *H01Q 5/378* (2015.01); *H01Q 9/28* (2013.01)

(58) Field of Classification Search
CPC .......... H01Q 5/378; H01Q 5/314; H01Q 5/28; H01Q 1/48; H01Q 1/50; H01Q 9/28; H01Q 9/42
See application file for complete search history.

(56) References Cited

U.S. PATENT DOCUMENTS 7,675,469 B2 3/2010 Ohba et al.
8,749,448 B2 6/2014 Tsou et al.
(Continued)

FOREIGN PATENT DOCUMENTS

CN 104103904 A * 10/2014 ............. H01Q 5/314
CN 104347943 2/2015
(Continued)

OTHER PUBLICATIONS

Supplementary European Search Report and the European Search Opinion dated Jul. 12, 2022 From the European Patent Office Re. Application No. 19952143.6. (8 Pages).
(Continued)

*Primary Examiner* — Hoang V Nguyen

(57) ABSTRACT

An antenna structure, PCB and mobile terminal for Sub-6G. The antenna structure includes a first branch and a second branch. The first branch includes an L-shaped arm and a first longitudinal arm extending outwardly from the PCB. The first longitudinal arm is connected to the ground of the PCB. One end of the L-shaped arm is connected to the end of the first longitudinal arm. The second branch is L-shaped, and one end of the second branch is connected to the antenna feed point of the PCB. At least one microstrip line is connected between the first longitudinal arm and the second branch.

19 Claims, 3 Drawing Sheets

(51) Int. Cl.

| | |
|---|---|
| ***H01Q 5/378*** | (2015.01) |
| ***H01Q 9/28*** | (2006.01) |

(56) References Cited

U.S. PATENT DOCUMENTS

| | | | | |
|---|---|---|---|---|
| 9,178,283 | B1 | 11/2015 | Obeidat | |
| 9,276,320 | B2 * | 3/2016 | Wu | H01Q 9/42 |
| 2008/0266190 | A1 | 10/2008 | Ohba et al. | |
| 2010/0026602 | A1 | 2/2010 | Hotta et al. | |
| 2014/0009342 | A1 | 1/2014 | Wei | |

FOREIGN PATENT DOCUMENTS

| | | |
|---|---|---|
| CN | 104953290 | 9/2015 |
| CN | 104979633 | 10/2015 |
| CN | 105406177 | 3/2016 |
| CN | 205376770 | 7/2016 |
| CN | 205646121 | 10/2016 |
| CN | 204353457 | 5/2018 |
| CN | 208782039 | 4/2019 |
| WO | WO 2017/122851 | 7/2017 |

OTHER PUBLICATIONS

Notification of Office Action and Search Report dated Jul. 8, 2020 From the State Intellectual Property Office of the People's Republic of China Re. Application No. 201911208873.0 and Its Translation of Office Action Into English. (17 Pages).

Notice of Allowance dated Jan. 6, 2021 From the State Intellectual Property Office of the People's Republic of China Re. Application No. 201911208873.0 and Its Translation Into English. (6 Pages).

International Search Report and the Written Opinion dated Aug. 27, 2020 From the International Searching Authority Re. Application No. PCT/CN2019/126729 and Its Translation of Search Report Into English. (8 Pages).

* cited by examiner

ANTENNA STRUCTURE FOR SUB-6G, PCB BOARD, AND MOBILE TERMINAL

RELATED APPLICATIONS

This application is a National Phase of PCT Patent Application No. PCT/CN2019/126729 having International filing date of Dec. 19, 2019, which claims the benefit of priority of Chinese Patent Application No. 201911208873.0 filed on Nov. 30, 2019. The contents of the above applications are all incorporated by reference as if fully set forth herein in their entirety.

FIELD AND BACKGROUND OF THE INVENTION

The present invention relates to a technical field of antenna design technologies of mobile terminals, and more particularly, to an antenna structure, PCB and mobile device for Sub-6G.

With the continuous development of wireless communication technology, mobile communication technology has entered the 5th generation (5G). When catering the 5G communication challenges through Sub-6G solution, for communication equipment, such as mobile phones and other mobile terminals, an antenna of the mobile terminal needs to be able to cover the new frequency band in addition to original 2G/3G/4G communication standards, which requires improved design or redesign of the antenna of the mobile terminal. Some antenna structures are available in current technologies at the cost of significantly changing component layout on printed circuit board (PCB), and even requires a complete redesign of the layout of PCB components. The redesign of the layout of PCB components not only requires a lot of manpower and resources, but also requires repeated debugging in the antenna design process, which is redundant. Current antenna structures are less reliable, so that current antennas for Sub-6G often have complex structure, and is difficult to adapt to the requirements of ultra-thin electronic devices. Additionally, the cost of current antennas for Sub-6G mobile terminals is generally high.

Technical Problems

Embodiments of the application example provide an antenna structure, PCB, and mobile terminal for Sub-6G, which can improve the overall component layout of a current PCB to meet the demand of antenna covering new frequency bands with less changes to overall structure design of the PCB.

SUMMARY OF THE INVENTION

Technical Solutions

In a first aspect, an embodiment of the application provides an antenna structure for Sub-6G comprising a first branch and a second branch. The first branch comprises an L-shaped arm and a first longitudinal arm extending outwardly from a PCB. The first longitudinal arm is connected to a ground of the PCB. An end of the L-shaped arm is connected to an end of the first longitudinal arm. The second branch is L-shaped, and one end of the second branch is connected to an antenna feed point of the PCB. At least one microstrip line is connected between the first longitudinal arm and the second branch.

In the antenna structure, the L-shaped arm comprises a first transverse arm and a second longitudinal arm. The second longitudinal arm has one end connected to the first transverse arm and the other end connected to the first longitudinal arm. The second longitudinal arm is connected in series with a first resonator element. The first resonator element is an inductor and/or a capacitor. The second branch comprises a second transverse arm and a third longitudinal arm. One end of the third longitudinal arm is connected to the second transverse arm and the other end of the third longitudinal arm is connected to an antenna feed point of the PCB. A second resonator element is connected in series to the third longitudinal arm. The second resonator element is an inductor and/or a capacitor.

In the antenna structure, the antenna structure further comprises a third branch. The third branch is L-shaped, where the third branch is disposed next to the second branch, and an end of the third branch is connected to the ground of the PCB.

In the antenna structure, the third branch is disposed in a rectangular area enclosed by the second branch.

In the antenna structure, the third branch comprises a third transverse arm and a fourth longitudinal arm. One end of the fourth longitudinal arm is connected to the third transverse arm and the other end to the ground of the PCB. The fourth longitudinal arm is connected to a third resonator element in series, where the third resonator element is an inductor and/or capacitor.

In the antenna structure, a resonator element is connected in series to the third longitudinal arm.

In the antenna structure, a zero-ohm resistor is connected in series to the microstrip line. This improvement allows better control over the length of the first branch part of the antenna to better accommodate the new frequency band requirements of the Sub-6G program.

In the antenna structure, the first longitudinal arm and the third longitudinal arm are connected at two ends of the microstrip line, and all of three transverse microstrip lines are connected between the first longitudinal arm and the second branch.

In the antenna structure, the antenna structure has three microstrip lines, each of which is connected in series with a zero-ohm resistor. The three microstrip lines are set from top to down in sequence. The second resonator element is disposed in a segment of the third longitudinal arm between a connection position of a topmost microstrip line and the third longitudinal arm, and a connection position of the second transverse arm and the third longitudinal arm.

In the antenna structure, the first branch together with the microstrip line forms an IFA antenna structure, the second branch forms an IFA antenna structure, and the third branch is an antenna parasitic unit.

In the antenna structure, the first longitudinal arm and the fourth longitudinal arm are respectively disposed on different sides of the third longitudinal arm. The first longitudinal arm is collinear with the second longitudinal arm. The first longitudinal arm, the third longitudinal arm and the fourth longitudinal arm are arranged in parallel. The first transverse arm, the second transverse arm, and the third transverse arm are arranged in parallel. An end of the first transverse arm, an end of the second transverse arm, and an end of the third transverse arm are in a same longitudinal plane.

In a second aspect, the disclosure provides a PCB comprising an antenna structure for a Sub-6G. The antenna structure comprises a first branch and a second branch. The first branch comprises an L-shaped arm and a first longitudinal arm extending outwardly from a PCB. The first longitudinal arm is connected to a ground of the PCB, and an end of the L-shaped arm is connected to an end of the first longitudinal arm. The second branch is L-shaped, and one end of the second branch is connected to an antenna feed point of the PCB. At least one microstrip line is connected between the first longitudinal arm and the second branch.

In the PCB, the antenna structure is disposed in a upper right portion of the PCB to make the present invention better suitable for portable mobile devices, such as smartphones.

In a third aspect, an embodiment of the application provides a mobile terminal with a PCB having an antenna structure for Sub-6G. The antenna structure comprises a first branch (1) and a second branch (2). The first branch (1) comprises an L-shaped arm (10) and a first longitudinal arm (11) extending outwardly from a PCB (5). The first longitudinal arm (11) is connected to a ground of the PCB (5). An end of the L-shaped arm (10) is connected to an end of the first longitudinal arm (11). The second branch (2) is L-shaped, and one end of the second branch (2) is connected to an antenna feed point of the PCB. At least one microstrip line (4) is connected between the first longitudinal arm (11) and the second branch (2). The L-shaped arm (10) comprises a first transverse arm (12) and a second longitudinal arm (13). The second longitudinal arm (13) has one end connected to the first transverse arm (12) and the other end connected to the first longitudinal arm (11). The second longitudinal arm (13) is connected in series with a first resonator element (6), where the first resonator element (6) is an inductor and/or a capacitor. The second branch (2) comprises a second transverse arm (20) and a third longitudinal arm (21). One end of the third longitudinal arm (21) is connected to the second transverse arm (20) and the other end of the third longitudinal arm (21) is connected to an antenna feed point of the PCB (5). A second resonator element (7) is connected in series to the third longitudinal arm (21), where the second resonator element (7) is an inductor and/or a capacitor. The antenna structure further comprises a third branch (3), where the third branch (3) is L-shaped, the third branch (3) is disposed next to the second branch (2), and an end of the third branch (3) is connected to the ground of the PCB (5).

In the mobile terminal, the third branch (3) is disposed in a rectangular area enclosable by the second branch (2).

In the mobile terminal, the third branch (3) comprises a third transverse arm (30) and a fourth longitudinal arm (31). One end of the fourth longitudinal arm (31) is connected to the ground of the third transverse arm (30) and the other end to the PCB (5). The fourth longitudinal arm (31) is connected to a third resonator element (8) in series, where the third resonator element (8) is an inductor and/or capacitor.

In the mobile terminal, a resonator element is connected in series to the third branch (3).

In the mobile terminal, a zero-ohm resistor (9) is connected in series on the microstrip line (4).

In the mobile terminal, the first branch (1) together with the microstrip line (4) forms an IFA antenna structure, the second branch (2) forms an IFA antenna structure, and the third branch (3) is an antenna parasitic unit.

In the mobile terminal, the first longitudinal arm (11) and the third longitudinal arm (21) are connected at two ends of the microstrip line (4). All of three transverse microstrip lines (4) are connected between the first longitudinal arm (11) and the second branch (2).

In the mobile terminal, the antenna structure has three microstrip lines, each of which is connected in series with a zero-ohm resistor. The three microstrip lines are set from top to down in sequence. The second resonator element (7) is disposed in a segment of the third longitudinal arm (21) between a connection position of a topmost microstrip line and the third longitudinal arm (21), and a connection position of the second transverse arm (20) and the third longitudinal arm (21).

In the mobile device, the mobile device is a portable electronic product, such as a smartphone, smart watch, smart bracelet, tablet, and laptop, or a smart wearable device, such as a smart helmet or smart glasses.

Useful Effect

This application provides a 5G communication equipment antenna structure suitable for the new frequency band of Sub-6G, which can be added directly on basis of a PCB component structure of a current 4G mobile terminal. The demand of Sub-6G antenna structure for mobile terminal is thus met through limited modification on overall structure design of the PCB, thus better solving many problems in current technology. The invention also has outstanding advantages of easy debugging and low cost.

BRIEF DESCRIPTION OF THE SEVERAL VIEWS OF THE DRAWINGS

To clear disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

IN THE DRAWINGS

Figure 1:
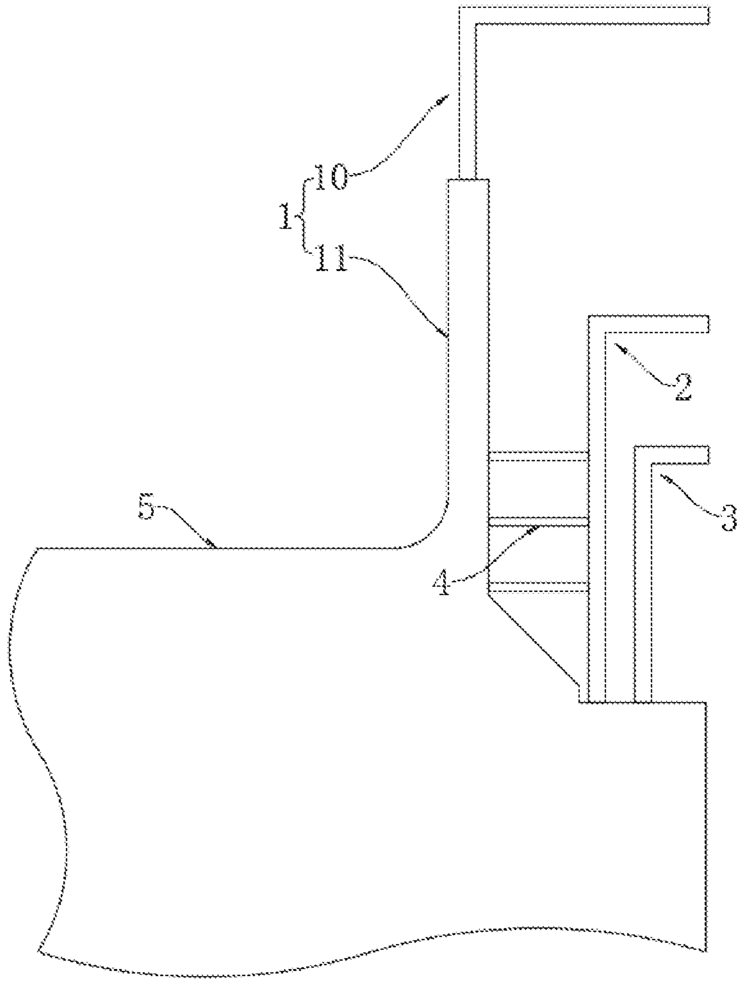
FIG. 1 is a schematic diagram showing an antenna structure for use with the Sub-6G according to one embodiment of the present invention.

1: first branching node; 10: L-shaped arm; 11: first longitudinal arm; 12: first transverse arm; 13: second longitudinal arm; 2: second branch; 20: second transverse arm; 21: the third longitudinal arm; 3: third branch; 30: third transverse arm; 31: fourth longitudinal arm; 4: microstrip lines; 5: PCBs; 6: first resonator element; 7: second resonator element; 8: third resonator element; 9: zero ohm resistors.

DESCRIPTION OF SPECIFIC EMBODIMENTS OF THE INVENTION

The following is a clear and comprehensive description of the technical solutions of an antenna structure, PCB and mobile terminal for Sub-6G according to the invention with reference to the drawings in the embodiments of the application. Obviously, the embodiments described are only part of this application, not for exhaustive illustration. Based on the embodiments of the application, other embodiments which may be easily obtained by those having ordinary skills in the art without paying additional creative effort fall within the scope of the application for protection.

In the description of the application, it is to be understood that directions or position relationships indicated by terms "center", "longitudinal", "transverse", "length", "width". "thickness", "top", "bottom", "front", "back", "left", "right", "vertical", "horizontal", "top", "bottom", "inside", "outside", "clockwise", "counterclockwise", and the similar are based on orientation or positional relationship shown in the drawings, is intended only to facilitate description of the application and simplify the description, and is not intended to indicate or imply that the device or component referred to must have a particular orientation, or be constructed or operated in a particular orientation, and are therefore not to be construed as limitations on the application. Moreover, the terms "first" and "second" are used for descriptive purposes only and are not to be understood as indicating or implying relative importance or the number of technical features indicated. Thus, a feature that is denoted by "first" or "second" may expressly or implicitly include one or more of the same features. In the description of the application, "more than one" means two or more, unless otherwise expressly and specifically indicated.

In the description of the present disclosure, it should be noted that, unless otherwise specified and defined, the terms "mounted", "connected", and "connection" should be understood broadly. For example, they may be a fixed connection, a detachable connected, indirectly connected through intermediaries, or an internal communication of two components or an interaction between two components. For those skilled in the art, the specific meanings of the above terms in the present disclosure may be understood according to specific circumstances.

In this application, the word "example" is used to represent giving an example, an illustration, or a description. Any embodiment described as "example" in this application should not be explained as being more preferred or having more advantages than another embodiment. To enable any person skilled in the art to implement and use the present invention, the following description is provided. Details are listed in the following description for explanation. It should be understood that a person of ordinary skill in the art may learn that the present invention can be implemented without using these specific details. In another instance, a well-known structure and a well-known process are not described in detail, to avoid obscure description of the present invention caused by unnecessary details. Therefore, the present invention is not limited to the shown embodiments, but is consistent with a maximum scope of a principle and features that are disclosed in this application.

Figure 2:
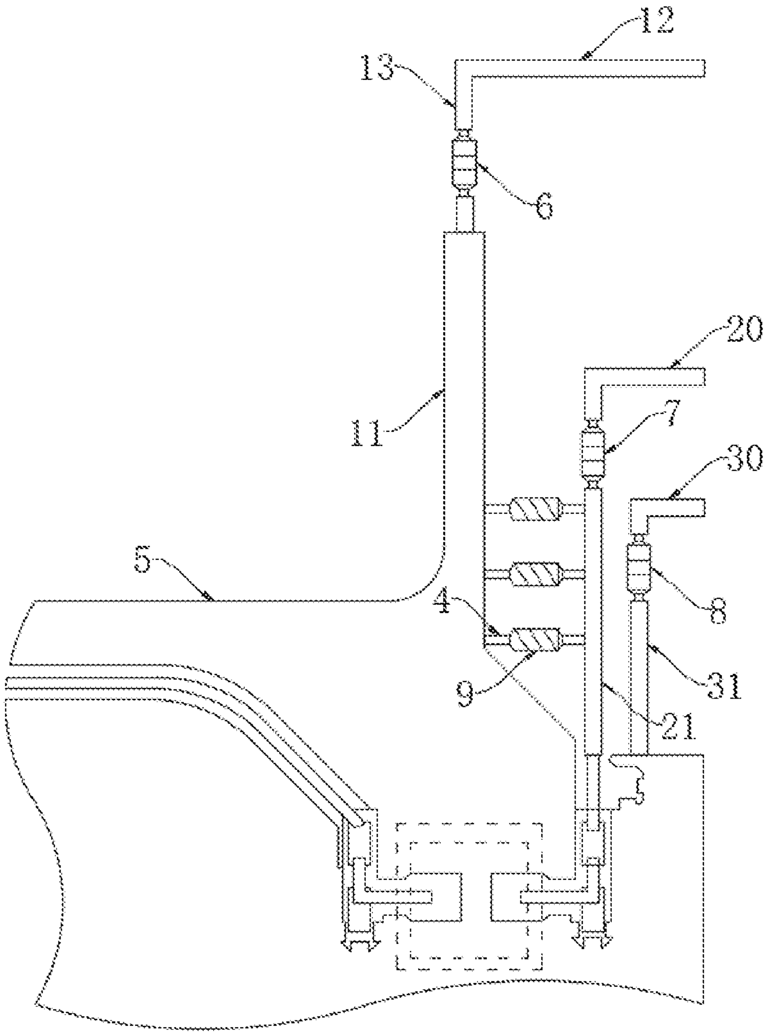
FIG. 2 is a schematic diagram showing an antenna structure for use with the Sub-6G according to another embodiment of the present invention.

Referring to FIG. 1, FIG. 1 is a schematic diagram of an embodiment of an antenna structure for Sub-6G. The antenna structure can be used in portable electronic products such as mobile phones, laptops, and tablet computers that have 5G functionality and use the Sub-6G frequency band, and has the advantages of easy debugging, low cost, and being suitable for the application on the new frequency band of Sub-6G for 5G. The preferred operating frequency of the disclosure is 3.3 GHz-5 GHz, which means that the antenna structure provided by the present invention enables antennas to be better resonant on the n77 (3.3 GHz-4.2 GHz) frequency band, the n78 (3.3 GHz-3.8 GHz) frequency band, and the n79 (4.4 GHz-5 GHz) frequency band. Specifically, the antenna structure includes a first branch 1 and a second branch 2. The first branch 1 includes an L-shaped arm 10 and a first longitudinal arm 11 extending outwardly from a printed circuit board (PCB) 5. The first longitudinal arm 11 is connected to a ground of the PCB 5. That is, the first longitudinal arm 11 can be treated as the ground of the PCB. One end of the L-shaped arm 10 is connected to an end of the first longitudinal arm 11. The "end of the first longitudinal arm 11" refers to the outward end of the first longitudinal arm 11. The second branch 2 is L-shaped, and one end of the second branch 2 is connected to an antenna feed point of PCB 5. The L-shaped arm 10 can be "inverted L-shaped" when installed. At least one microstrip line 4 is connected between the first longitudinal arm 11 and the second branch 2. The first longitudinal arm 11, the L-shaped arm 10 and the microstrip line 4 may form an F branch. The first branch 1 and the microstrip line 4 together form an IFA antenna (Invert-F antenna/inverted F antenna) structure, and the second branch 2 also forms an IFA antenna (Invert-F antenna/inverted F antenna) structure. When applied specifically to the Sub-6G band, L-shaped arm 10, first longitudinal arm 11, microstrip line 4, and L-shaped second branch 2 are jointly used in the n77 (3.3 GHz-4.2 GHz) band and the n78 (3.3 GHz-3.8 GHz) band. The embodiment of the disclosure provides a PCB antenna structure with a three-branch structure as a further improved technical solution. The antenna structure further includes a third branch 3 for broadening resonation bandwidth. The antenna using the unique multi branch structure of the present embodiment is capable of covering a wider frequency band. Specifically, the third branch 3 is an antenna parasitic unit, the third branch 3 is L-shaped, and the third branch 3 is positioned next to the second branch 2. One end of the third branch 3 is connected to the ground of the PCB 5. The PCB antenna with the three-branch structure of the present invention is capable of being applied to three frequency bands. When specifically applied to the Sub-6G band, the L-shaped third branch 3, the microstrip line 4, the L-shaped second branch 2, and the first longitudinal arm 11 are used together in the n79 (4.4 GHz-5 GHz) band in addition to the above-mentioned n77 (3.3 GHz-4.2 GHz) band and the n78 (3.3 GHz-3.8 GHz) band. Both the second and third branches can be installed in an "inverted L-shape". After a lot of experiments, it is found unexpectedly that if the third branch 3 is set in a rectangular area enclosed by the second branch 2, the arrangement can achieve better frequency band coverage, as shown in FIG. 1 and FIG. 2. The PCB antenna structure provided by the present invention has the outstanding advantages of simplicity, compactness and a high degree of integration, and can be supplements on the basis of current PCB component structure of 4G mobile terminals, without excessive changes to the original PCB architecture, and even without redesigning the PCB architecture. This makes it possible to debug or simulate the invention quickly, conveniently and accurately on the basis of the original design. The quality control is less difficult, which greatly improves the efficiency and progress of the simulation or debugging tasks for engineers, thus reducing the overall cost of a single batch of PCBs and can significantly shorten the product delivery cycle for PCB manufacturers.

Referring to FIG. 2, FIG. 2 is a schematic diagram of another embodiment of the antenna structure for Sub-6G provided by the present invention. In a specific embodiment, the aforementioned L-shaped arm 10 includes a one-piece first transverse arm 12 and a second longitudinal arm 13. Two ends of the second longitudinal arm 13 are respectively connected to the first transverse arm 12 and the first longitudinal arm 11. A first resonator element 6 is connected in series to the second longitudinal arm 13, where the first resonator element 6 is an inductor and/or capacitor. The "inductor and/or capacitor" shall be construed as one of the three cases of "inductance", "capacitance" or "inductance and capacitance", so that the resonant length of the first branch can be adjusted according to specific application scenarios of the mobile terminal. Of course, the L-shaped arm 10 can be made into an assembled structure as required by special circumstances. The second branch 2 includes a second transverse arm 20 and a third longitudinal arm 21 in one piece. The two ends of the third longitudinal arm 21 are respectively connected to the second transverse arm 20 and the antenna feed point of the PCB 5. The third arm 21 is connected in series with a second resonator element 7, which is an inductor and/or capacitor, so that a resonant length of the second branch can be adjusted according to specific application scenarios of the mobile terminal. Of course, the second branch 2 can also be made into an assembled structure according to special situations.

Referring to FIG. 2, in a specific embodiment, the third branch 3 comprises a one-piece third transverse arm 30 and a fourth longitudinal arm 31. Two ends of the fourth longitudinal arm 31 are respectively connected to the third transverse arm 30 and the ground of the PCB 5. The fourth longitudinal arm 31 is connected in series with a third resonator element 8. The third resonator element 8 is an inductor and/or a capacitor, so that a resonant length of the third branch can be adjusted according to specific application scenarios of the mobile terminal. Additionally, when the resonator element is connected in series on the third branch 3, interference of the parasitic unit to the first branch 1 and the second branch 2 resonating on the frequency band n77 (3.3 GHz-4.2 GHz) and n78 (3.3 GHz-3.8 GHz) can be significantly reduced. This embodiment has a zero-ohm resistor 9 in series on the microstrip line 4. This design enables the length of the first branch to be adjusted according to the specific application scenarios of the mobile terminal to better adapt to resonation on the n77 (3.3 GHz-4.2 GHz) frequency band in the Sub-6G frequency band. Of course, the third branch 3 can also be made into an assembled structure according to special situations. For specific applications, the antenna feed point can be led from an antenna matching device disposed on the PCB, and a radio frequency (RF) test point can be located next to the antenna matching device (dashed square part on PCB 5 in FIGS. 2 and 3). In specific processing of the various components of the antenna structure, the first transverse arm 12, the second longitudinal arm 13, the second transverse arm 20, the third longitudinal arm 21, the third transverse arm 30, and the fourth longitudinal arm 31 of the present invention can be processed by selecting a suitable material, such as any one of copper, aluminum, iron, tin, silver, gold, or platinum, or any two or more alloys of copper, aluminum, iron, tin, silver, gold, or platinum when needed. Of course, a person with ordinary skills in the field may also select other materials suitable for making antenna branches according to actual situations.

Figure 3:
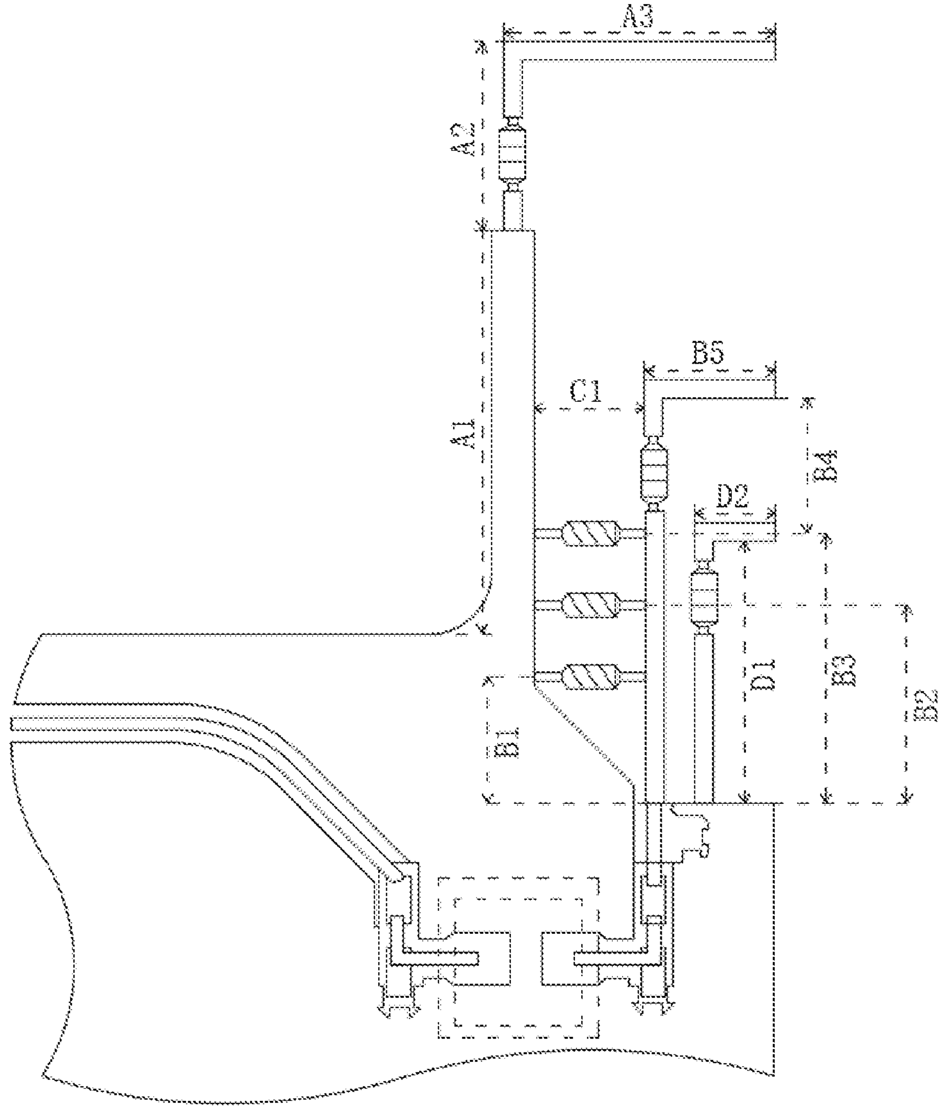
FIG. 3 is a schematic diagram showing dimensional labeling to various parts of the antenna structure for use with Sub-6G according to one embodiment of the present invention.

Referring to FIG. 3, in a specific embodiment, all dimensions affecting the resonating effect are labeled for the purpose of specifying dimensions of the microstrip line. Based on the present disclosure, specific dimension values can be appropriately designed according to requirements of the mobile terminal and PCB during practical applications The key structural parameters for the effect with frequency bands are shown in the following table.

| | |
|---|---|
| n77 (3.3 GHz-4.2 GHz) | A1, A2, A3, B1 (or B2 or B3), C1 |
| n78 (3.3 GHz-3.8 GHz) | A1, A2, A3, B1 (or B2 or B3), C1 |

-continued

| | |
|---|---|
| n79 (4.4 GHz-5 GHz) | B3, B4, B5, C1, D1, D2 |

As shown in FIG. 3, A1 indicates a length of the first longitudinal arm. A2 indicates a length of the second longitudinal arm. A3 indicates a length of the first transverse arm. B1 indicates the distance between the lowermost microstrip line and the bottom end of the third longitudinal arm. B2 indicates the distance between the middle microstrip line and the bottom end of the third longitudinal arm. B3 indicates the distance between the uppermost microstrip line and the bottom end of the third longitudinal arm. B4 indicates the distance between the second transverse arm and the third transverse arm. B5 indicates a length of the second transverse arm. C1 indicates the distance between the first arm and the third arm. D1 indicates a length of the fourth arm. D2 indicates the length of the third transverse arm.

In specific embodiments, when the antenna structure is provided based on the present invention covers the additional frequency band of Sub-6G, as shown in FIG. 3, the values of A1, A2, A3, B1 (or B2 or B3), and C1 are used to influence the resonating effect of the PCB antenna on the n77 (3.3 GHz-4.2 GHz) frequency band signals. Similarly, the values of A1, A2, A3, B1 (or B2 or B3), and C1 are used to influence the resonating effect of the PCB antenna on the n78 (3.3 GHz-3.8 GHz) band signals. While the values of B3, B4, B5, C1, D1, and D2 are used to influence the resonating effect of the PCB antenna on the n79 (4.4 GHz-5 GHz) band signals.

In a specific embodiment, two ends of the microstrip line 4 are respectively connected to the first longitudinal arm 11 and the third longitudinal arm 21, and three transverse microstrip wires are connected between the first longitudinal arm 11 and the second branch 2. In a specific application, the three transverse microstrip wires between the first longitudinal arm 11 and the second branch 2 can be provided with zero-ohm resistors through surface mounted technology (SMT). Alternatively, one or two of the microstrip lines can be set isolated. That is, the present invention allows the microstrip lines to be separated so that the antenna length can be better tuned according to actual application scenarios. When the antenna structure has three microstrip lines, each microstrip line can be connected in series with a zero-ohm resistor, and the three microstrip lines are set from top to down in sequence. In particular, the second resonator element 7 is disposed in a segment of the third longitudinal arm 21 between a connection position of a topmost microstrip line and the third longitudinal arm 21, and a connection position of the second transverse arm 20 and the third longitudinal arm 21.

In a specific embodiment, as shown in FIG. 2, the first longitudinal arm 11 and the fourth longitudinal arm 31 are disposed on two sides of the third longitudinal arm 21. For example, the first longitudinal arm 11 is positioned on the left side of the third longitudinal arm 21 and the fourth longitudinal arm 31 is positioned on the right side of the third longitudinal arm 21, with the first longitudinal arm 11 and the second longitudinal arm 13 are colinear, that is, with the same axis. More specifically, the first longitudinal arm 11, the third longitudinal arm 21, and the fourth longitudinal arm 31 are set parallel to each other. The first arm 12, the second arm 20 and the third arm 30 are set parallel to each other. The first transverse arm 12, the second transverse arm 20, and the third transverse arm 30 are located from top to bottom in sequence. As an improved technical solution, an end of the first transverse arm 12, an end of the second transverse arm 20 and an end of the third transverse arm 30 in this embodiment are in a same longitudinal plane. More specifically, the end of the first transverse arm 12, the end of the second transverse arm 20 and the end of the third transverse arm 30 are one a same line.

The present invention further specifically provides a PCB, as shown in FIGS. 1 and 2, which may include an antenna structure for Sub-6G in any of the aforementioned structures. For the PCB provided by the present invention, the antenna size is small relative to the PCB (motherboard) size because of the characteristics of the small resonant wavelength of the PCB antenna at the medium and high frequency, where the antenna length resonating at a quarter wavelength. As a consequence, the antenna formed on the PCB of the present invention has the advantage of occupying little space and is suitable for application in ultra-thin mobile terminals, such as ultra-thin mobile phones. In a specific embodiment, the antenna structure is placed on the upper right side of the PCB, which enables a better layout of components on the PCB and makes the PCB more suitable for mobile terminals such as smartphones. The PCB may further include a first resonator circuit connected to the second longitudinal arm 13 (not shown), a feed circuit connected to the third longitudinal arm 21 (not shown), and a second resonator circuit connected to the fourth longitudinal arm 31 (not shown). The resonator circuit and feed circuit can be appropriately selected from currently available technologies according to what is needed for the PCB antenna and are not redundantly detailed herein.

Embodiments of the present application further provide a mobile terminal, and the mobile terminal comprises a PCB comprising an antenna structure for Sub-6G. The antenna structure comprises:

a first branch (1) and a second branch (2). The first branch (1) comprises an L-shaped arm (10) and a first longitudinal arm (11) extending outwardly from the PCB (5). The first longitudinal arm (11) is connected to the ground of the PCB (5). One end of the L-shaped arm (10) is connected to an end of the first longitudinal arm (11). The second branch (2) is L-shaped. One end of the second branch (2) is connected to the antenna feed point of the PCB (5). At least one microstrip line (4) is connected between the first longitudinal arm (11) and the second branch (2). The L-shaped arm (10) comprises a first transverse arm (12) and a second longitudinal arm (13). Two ends of the second longitudinal arm (13) are respectively connected to the first transverse arm (12) and the first longitudinal arm (11). The second longitudinal arm (13) is connected in series with a first resonator element (6). The first resonator element (6) is an inductor and/or a capacitor. The second longitudinal arm (2) comprises a second transverse arm (20) and a third longitudinal arm (21). Two ends of the third longitudinal arm (21) are respectively connected to the second transverse arm (20) and the antenna feed point of the PCB (5). A second resonator element (7) is connected in series to the third longitudinal arm (21). The second resonator element (7) is an inductor and/or a capacitor. The antenna structure further includes a third branch (3). The third branch (3) is L-shaped. The third branch (3) is positioned next to the second branch (2). One end of the third branch (3) is connected to the ground of the PCB (5).

Wherein the third branch (3) is disposed within a rectangular area enclosed by the second branch (2).

In the mobile terminal, the third branch joint (3) comprises a third transverse arm (30) and a fourth longitudinal arm (31). Two ends of the fourth longitudinal arm (31) are respectively connected to the third transverse arm (30) and the ground of the PCB (5). A third resonator element (8) is connected in series to the fourth longitudinal arm (31). The third resonator element (8) is an inductor and/or a capacitor.

In particular, a resonator element is connected in series on the third branch (3).

In particular, a zero-ohm resistor (9) is connected in series on the microstrip line (4).

In particular, the first branch (1) together with the microstrip line (4) forms a structure of an IFA antenna. The second branch (2) is an IFA antenna. The third branch (3) is an antenna parasitic unit.

In particular, two ends of the microstrip line (4) are respectively connected to the first longitudinal arm (11) and the third longitudinal arm (21). Three transverse microstrip lines (4) are connected between the first longitudinal arm (11) and the second longitudinal node (2).

The antenna structure has three microstrip lines, each of which is connected in series with a zero-ohm resistor. The three microstrip lines are located from top to bottom in sequence. The second resonator element (7) is disposed in a segment of the third longitudinal arm (21) between a connection position of a topmost microstrip line and the third longitudinal arm (21), and a connection position of the second transverse arm (20) and the third longitudinal arm (21).

The present invention further provides a mobile terminal which includes the aforementioned PCB. The PCB material can be appropriately selected according to the actual situation, such as FR-4 epoxy glass cloth laminate or the similar. The mobile terminal further includes a control module (not shown), a WIFI module (not shown) and a Bluetooth module (not shown) and other conventional various circuit function modules required by various mobile terminals, which can be reasonably selected according to the actual needs of the mobile terminal, which are not redundantly detailed in the disclosure.

The above description is merely some illustrative embodiments of the present invention, which does not limit the scope of the invention. Any equivalent modification, replacement, and improvement based on the invention, should be included in the scope of claims of the invention.

What is claimed is:

1. An antenna structure for Sub-6G comprising:

a first branch; and a second branch;

wherein the first branch comprises an L-shaped arm and a first longitudinal arm extending outwardly from a PCB, the first longitudinal arm is connected to a ground of the PCB, and an end of the L-shaped arm is connected to an end of the first longitudinal arm, the second branch is L-shaped, and one end of the second branch is connected to an antenna feed point of the PCB, and at least one microstrip line is connected between the first longitudinal arm and the second branch;

wherein the L-shaped arm comprises a first transverse arm and a second longitudinal arm, the second longitudinal arm has one end connected to the first transverse arm and the other end connected to the first longitudinal arm, the second longitudinal arm is connected in series with a first resonator element, the first resonator element is an inductor and/or a capacitor, the second branch comprises a second transverse arm and a third longitudinal arm, one end of the third longitudinal arm is connected to the second transverse arm and the other end of the third longitudinal arm is connected to an antenna feed point of the PCB, and a second resonator element is connected in series to the third longitudinal arm, and the second resonator element is an inductor and/or a capacitor.

2. The antenna structure for Sub-6G according to claim 1, wherein the antenna structure further comprises a third branch, the third branch is L-shaped, the third branch is disposed next to the second branch, and an end of the third branch is connected to the ground of the PCB.

3. The antenna structure for the Sub-6G according to claim 2, wherein the third branch is disposed in a rectangular area enclosed by the second branch.

4. The antenna structure for Sub-6G according to claim 2, wherein the third branch comprises a third transverse arm and a fourth longitudinal arm, one end of the fourth longitudinal arm is connected to the third transverse arm and the other end to the ground of the PCB, and the fourth longitudinal arm is connected to a third resonator element in series, the third resonator element is an inductor and/or capacitor.

5. The antenna structure for Sub-6G according to claim 4, wherein a resonator element is connected in series to the third branch.

6. The antenna structure for Sub-6G according to claim 4, wherein a zero-ohm resistor is connected in series to the microstrip line.

7. The antenna structure for Sub-6G according to claim 6, wherein the first branch together with the microstrip line forms an IFA antenna structure, the second branch forms an IFA antenna structure, and the third branch is an antenna parasitic unit.

8. The antenna structure for Sub-6G according to claim 4, wherein the first longitudinal arm and the fourth longitudinal arm are respectively disposed on different sides of the third longitudinal arm, the first longitudinal arm is collinear with the second longitudinal arm, the first longitudinal arm, the third longitudinal arm and the fourth longitudinal arm are arranged in parallel, the first transverse arm, the second transverse arm, and the third transverse arm are arranged in parallel, with an end of the first transverse arm, an end of the second transverse arm, and an end of the third transverse arm are in a same longitudinal plane.

9. The antenna structure for Sub-6G according to claim 1, wherein the first longitudinal arm and the third longitudinal arm are connected at two ends of the microstrip line, and all of three transverse microstrip lines are connected between the first longitudinal arm and the second branch.

10. The antenna structure for Sub-6G according to claim 9, wherein the antenna structure has three microstrip lines, each of which is connected in series with a zero-ohm resistor, the three microstrip lines are set from top to down in sequence, wherein the second resonator element is disposed in a segment of the third longitudinal arm between a connection position of a topmost microstrip line and the third longitudinal arm, and a connection position of the second transverse arm and the third longitudinal arm.

11. A PCB comprising an antenna structure for a Sub-6G, wherein the antenna structure comprises:

a first branch; and a second branch;

wherein the first branch comprises an L-shaped arm and a first longitudinal arm extending outwardly from a PCB, the first longitudinal arm is connected to a ground of the PCB, and an end of the L-shaped arm is connected to an end of the first longitudinal arm, the second branch is L-shaped, and one end of the second branch is connected to an antenna feed point of the PCB, and at least one microstrip line is connected between the first longitudinal arm and the second branch;

wherein the L-shaped arm comprises a first transverse arm and a second longitudinal arm, the second longitudinal arm has one end connected to the first transverse arm and the other end connected to the first longitudinal arm, the second longitudinal arm is connected in series with a first resonator element, the first resonator element is an inductor and/or a capacitor, the second branch comprises a second transverse arm and a third longitudinal arm, one end of the third longitudinal arm is connected to the second transverse arm and the other end of the third longitudinal arm is connected to an antenna feed point of the PCB, and a second resonator element is connected in series to the third longitudinal arm, and the second resonator element is an inductor and/or a capacitor.

12. A mobile terminal with a PCB having an antenna structure for Sub-6G, wherein the antenna structure comprises:

a first branch; and a second branch;

wherein the first branch comprises an L-shaped arm and a first longitudinal arm extending outwardly from a PCB, the first longitudinal arm is connected to a ground of the PCB, and an end of the L-shaped arm is connected to an end of the first longitudinal arm, the second branch is L-shaped, and one end of the second branch is connected to an antenna feed point of the PCB, and at least one microstrip line is connected between the first longitudinal arm and the second branch;

wherein the L-shaped arm comprises a first transverse arm and a second longitudinal arm, the second longitudinal arm has one end connected to the first transverse arm and the other end connected to the first longitudinal arm, the second longitudinal arm is connected in series with a first resonator element, the first resonator element is an inductor and/or a capacitor, the second branch comprises a second transverse arm and a third longitudinal arm, one end of the third longitudinal arm is connected to the second transverse arm and the other end of the third longitudinal arm is connected to an antenna feed point of the PCB, and a second resonator element is connected in series to the third longitudinal arm, and the second resonator element is an inductor and/or a capacitor;

wherein the antenna structure further comprises a third branch, the third branch is L-shaped, the third branch is disposed next to the second branch, and an end of the third branch is connected to the ground of the PCB.

13. The mobile terminal according to claim 12, wherein the third branch is disposed in a rectangular area enclosable by the second branch.

14. The mobile terminal according to claim 12, wherein the third branch comprises a third transverse arm and a fourth longitudinal arm, one end of the fourth longitudinal arm is connected to the third transverse arm and the other end to the ground of the PCB, and the fourth longitudinal arm is connected to a third resonator element in series, the third resonator element is an inductor and/or capacitor.

15. The mobile terminal according to claim 14, wherein a resonator element is connected in series to the third branch.

16. The mobile terminal according to claim 14, wherein a zero-ohm resistor is connected in series on the microstrip line.

17. The mobile terminal according to claim 16, wherein the first branch together with the microstrip line forms an IFA antenna structure, the second branch forms an WA antenna structure, and the third branch is an antenna parasitic unit.

18. The mobile terminal according to claim 12, wherein the first longitudinal arm and the third longitudinal arm are connected at two ends of the microstrip line, and all of three transverse microstrip lines are connected between the first longitudinal arm and the second branch.

19. The mobile terminal according to claim 18, wherein the antenna structure has three microstrip lines, each of which is connected in series with a zero-ohm resistor, the three microstrip lines are located from top to down in sequence, wherein the second resonator element is disposed in a segment of the third longitudinal arm between a connection position of a topmost microstrip line and the third longitudinal arm, and a connection position of the second transverse arm and the third longitudinal arm.

* * * * *